United States Patent
Li et al.

(10) Patent No.: US 9,267,032 B1
(45) Date of Patent: Feb. 23, 2016

(54) CRYSTALLINE POLYESTER LATEX PRODUCTION BY SOLVENT REUSE PHASE INVERSION EMULSIFICATION

(71) Applicant: Xerox Corporation, Norwalk, CT (US)

(72) Inventors: Shigeng Li, Penfield, NY (US); Yanjia Zuo, Rochester, NY (US); Shigang Qiu, Toronto (CA); Peter V Nguyen, Webster, NY (US); Amy A Grillo, Rochester, NY (US); Steven M Malachowski, East Rochester, NY (US); Chieh-Min Cheng, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/535,294

(22) Filed: Nov. 6, 2014

(51) Int. Cl.
| | | |
|---|---|---|
| G03G 5/00 | (2006.01) | |
| C08K 5/34 | (2006.01) | |
| C08L 67/00 | (2006.01) | |
| C08L 67/06 | (2006.01) | |
| C08L 77/00 | (2006.01) | |
| C08L 79/08 | (2006.01) | |

(52) U.S. Cl.
CPC .................. *C08L 67/00* (2013.01); *C08L 67/06* (2013.01); *C08L 77/00* (2013.01); *C08L 79/08* (2013.01)

(58) Field of Classification Search
None
See application file for complete search history.

(56) References Cited

U.S. PATENT DOCUMENTS

2011/0281216 A1* 11/2011 Qiu et al. ................. 430/137.14

* cited by examiner

*Primary Examiner* — Susannah Chung
*Assistant Examiner* — Robert T Butcher

(57) ABSTRACT

A process for making a crystalline latex emulsion suitable for use in toner using phase invention emulsification (PIE) where solvent is reused is presented.

20 Claims, No Drawings

CRYSTALLINE POLYESTER LATEX PRODUCTION BY SOLVENT REUSE PHASE INVERSION EMULSIFICATION

FIELD

The disclosure relates to phase inversion emulsification (PIE) processes for producing crystalline polyester resin emulsions using solvent and water from a previous PIE reaction.

BACKGROUND

Latex emulsions may be produced using PIE in which resins are dissolved in a mixture of water, base and organic solvent(s) (e.g., methyl ethyl ketone (MEK), isopropyl alcohol (IPA) or both) to form a homogenous water-in-oil (W/O) dispersion (i.e., water droplets dispersed in continuous oil). Subsequently, water is added to convert the dispersion into a stable oil-in-water (O/W) latex. In embodiments, the solvents, distillates and liquids of a PIE process are collected and reused (solvent reuse or SR) in a subsequent PIE process.

Amorphous polyester latexes may be produced using SR PIE with methyl ethyl ketone (MEK) and isopropyl alcohol (IPA) as solvents. The organic solvents may be removed via vacuum distillation under mixing at elevated temperature. SR processes for amorphous polyester resins provide savings in raw materials cost and solvent disposal, leading to reduction in toner production cost. Particle size of amorphous resins in an SR PIE process using MEK and IPA correlates with the amount of IPA in the mixture. An SR PIE process for crystalline resins, if possible, would be desirable.

SUMMARY

The instant disclosure describes solvent reuse (SR) processes to obtain crystalline polyester (CPE) latexes by phase inversion emulsification (PIE).

In embodiments, a method of PIE is disclosed including: optionally adding to a first aqueous distillate comprising a first concentration of a solvent and a base, a solvent and/or a base to form a first mixed aqueous distillate and dissolving therein a first CPE resin having one or more acid groups to form a first dispersion; neutralizing the one or more acid groups by adding a base to said first dispersion to form a first neutralized dispersion; adding a first water portion to said first neutralized dispersion to form a first latex emulsion; distilling solvent from said first latex emulsion; and separating CPE particles from said first latex emulsion to form a second water portion therefrom to obtain resin particles. The distilled solvent from said first latex emulsion is used to produce a second aqueous distillate comprising a second concentration of a solvent and a base and dissolving therein a second CPE resin having one or more acid groups to form a second dispersion; neutralizing the one or more acid groups by adding a base to the second dispersion to form a second neutralized dispersion; adding said second water portion to the second neutralized dispersion to form a second latex emulsion; and separating solvent and water portions or fractions from said second latex emulsion to form CPE resin particles. The process can be cycled, where the solvent-rich and water-rich fractions of portions are used in a subsequent PIE with periodic addition of regents as needed. In embodiments, the first CPE and second CPE can be the same. In embodiments, the first concentration and the second concentration can be the same.

In embodiments, a PIE method is disclosed as described above, wherein said solvent comprises a mixture of organic solvents, in embodiments, said mixture comprises two organic solvents, in embodiments, said two organic solvents comprise MEK and IPA. In embodiments, the reagent used to neutralize the CPE comprises ammonium hydroxide (AH).

DETAILED DESCRIPTION

Crystalline polyester can have a role in controlling fusing properties of toners, such as, low melt toners, such as, ultra low melt (ULM) toners. To make toner, those polyester resins first must be converted into latexes with certain particle size and particle size distribution, while maintaining desirable resin properties.

Polyester latexes may be produced using PIE. Following formation of a uniform suspension of polyester particles in a water continuous phase via phase inversion, the solvent that was used initially to dissolve the resin then is stripped from the suspension by, for example, vacuum distillation. The aqueous portion of the emulsion can be removed by distillation or other separation methods, such as, centrifugation, decanting and so on. The resin particles then can be used, for example, to make toner, for example, by emulsion aggregation (EA).

When only distillation is practiced to remove fluids from the resin particles, distillate during the stripping process may be separated into two parts (distillate I and distillate II) according to the chemical composition of the two fractions and the stage or temperature at which the distillate is recovered from the emulsion. Distillate I contains higher concentrations of organic solvent and neutralizing agent (NA), which is used to dissolve resin in a subsequent PIE reaction. Distillate I may be compensated with fresh solvent(s) and/or NA based on the desired PIE formulation (for example, the concentration of the solvent(s) and the concentration of the NA) as a design choice. The bulk of distillate II primarily is water and in the next PIE reaction, distillate II is mixed with any necessary or additional water and added to the PIE reaction to induce phase inversion. Hence, the distillate of a first PIE reaction can be used in a subsequent PIE reaction, with refreshing of reagents to achieve a desired concentration of reagent(s) as needed. Reuse of reagents reduces production cost and results in almost zero release of hazardous materials into the environment.

While particle size of amorphous resins in an SR PIE process using MEK and IPA correlates with the amount of IPA present in the emulsion, it was revealed that is not the case for crystalline resins. It was revealed that for making crystalline resin using SR PIE, the amount of NA, such as, AH, impacts CPE particle size. Commonly, three parts or portions of NA are involved in an SR PIE process for CPE: (1) NA in distillate I, the solvent-rich fraction of a prior PIE (NA I); (2) any fresh NA charged during the subsequent PIE process to dissolve resin (NA II); and (3) NA in distillate II, the water-rich fraction of the prior PIE (NA III).

PIE

The Brinkman model may be used to simulate PIE and to predict the phase inversion point (PIP) and hence, the amount of water added to the organic solvent mixture containing dissolved resin to attain phase inversion according to the solvent ratio and reaction temperature.

Analysis in a stirred vessel demonstrates that for PIE, resin drop size increases significantly near phase inversion, while secondary resin droplets also may be formed. While not being bound by theory, it seems that the phase inversion process includes the break-up and coalescence of droplets corresponding to the formation of double emulsions.

Brinkman (J Chem Phy (1952) 20:571) applied a slightly different approach by accounting for the incremental change in viscosity due to the addition of one extra solute molecule to a dispersion of known concentration deriving equation 4 (eq. 4):

$$\frac{\mu_\varphi}{\mu_c} = (1-\emptyset)^{-2.5} \quad \text{(eq. 4)}$$

where $\mu_\varphi$ represents viscosity of the dispersed phase, $\mu_c$ is viscosity of the continuous phase and $\Phi$ is water fraction. Because there is no assumption on the shape and size of the droplets, that model allows for polydispersity, but interactions between adjacent particles when closely packed are not considered.

While not being bound by theory, phase inversion is believed to take place at the phase fraction where the difference in viscosity between the oil continuous and the water continuous dispersions become substantially equivalent. The Brinkman model was found to have best agreement with experimental data of oil/water systems of different oil viscosities regardless of mixture viscosity and dispersion initialization.

The solvent continuous phase eventually becomes the dispersed phase in the water continuous phase, while the added water droplets appear in the solvent drops and dominate the continuous phase. In embodiments, that model is used to predict the PIP of a PIE process.

As disclosed herein, since the latex particle is stable after PIP is reached, PIE productivity may be improved by taking advantage of that characteristic; i.e., identify the PIP and reduce cycle time by increasing the water feeding rate according to the formulation.

While not being bound by theory, it seems several parameters impact phase inversion, however, the viscosities of the phases, including the dispersion mixture viscosity, appear to dominate the PIE process. The mixture viscosity is related to the pressure gradient which drives the dispersion. Therefore, as disclosed herein, mixture viscosity is suggested to be an important parameter for prediction of the PIE process.

The viscosity of a dual-solvent mixture may be calculated by the Refutas equation. The calculation is carried out in the following steps:

(i) calculating the viscosity blending number (VBN) for each component of the mixture using equation 1 (eq. 1):

$$\text{VBN} = 14.534 \times \ln[\ln(v+0.8)] + 10.975 \quad \text{(eq. 1)},$$

where v is the kinematic viscosity in centistokes (cSt);

(ii) calculating the VBN of the mixture using equation 2 (eq. 2):

$$\text{VBN}_{mixture} = [X_A \times \text{VBN}_A] + [X_B \times \text{VBN}_B] + \ldots [X_N \times \text{VBN}_N] \quad \text{(eq. 2)}$$

where X is the mass fraction of each component of the mixture, (iii) calculating the kinematic viscosity of the blend by solving eq. 1 for v resulting in equation 3 (eq. 3), and $$v = \exp\left(\exp\left(\frac{\text{VBN}_{mixture} - 10.975}{14.534}\right)\right) - 0.8, \quad \text{(eq. 3)}$$

(iv) calculating the water fraction at the maximum $\text{VBN}_{mixture}$ for the mixture using equation 4 (eq. 4):

$$\frac{\mu_\varphi}{\mu_c} = (1-\emptyset)^{-2.5}, \quad \text{(eq. 4)}$$

where $\mu_{100}$ is viscosity of the dispersed phase of the mixture, $\mu_c$ is viscosity of the continuous phase of the mixture, which is equal to the $\text{VBN}_{mixture}$, and $\Phi$ is water fraction of the mixture, where the calculated $\Phi$ is the sum of the first portion of water, any water portion of the optional NA and a second portion of water, where the total amount is the amount of water needed to attain the PIP of the mixture.

Using that model, particle size and size distribution are stable right after the PIP.

Simulation of a CPE SR process using the formulation described in Table 1 was used to calculate the PIP and the corresponding DI water amount needed to obtain phase inversion.

TABLE 1

Formulation CPE for SR PIE

| Chemicals | Parts | Percentage (%) | Quantity (g) |
|---|---|---|---|
| CPE Resin | 10.0 | 26.69 | 200 |
| [1]MEK | 6.0 | 16.01 | 120 |
| [1]IPA | 1.0 | 2.67 | 20 |
| [1]NA I | 0.20 | 0.53 | 4.0 |
| [1]DI water I | 5 | 13.34 | 100 |
| [1]NA II | 0.27 | 0.72 | 5.4 |
| [2]DI water II | 15 | 40.03 | 300 |
| Total | 37.5 | 100.00 | 749.4 |

[1]Items of distillate I, and [2], items of distillate II.

With NA being AH or (Amm), phase inversion takes place at 54% water fraction, corresponding to 202 g of DI water (DIW) in a reaction of 200 g of resin (Table 1). Thus, only 102 g of the 300 g of DI water II are needed to complete phase inversion. It was revealed the remainder of DI water II does not impact final latex particle size and size distribution. Hence, all of DI water II can be mixed with the resin emulsion for phase inversion without compromising latex properties. The composition of the distillates is presented in Table 2.

At production level, distillate I may be controlled below 6000 lbs. and the maximum distillate II will be 3000 lbs. when the PIE batch contains 7000 lbs. of CPE resin. Thus, based thereon, for 200 g resin, the scale-down numbers are 170.5 g of distillate I and 85.2 g of distillate II.

TABLE 2

Distillate composition measured by GC and titration.

| | MEK (wt %) | MEK (g) | IPA (wt %) | IPA (g) | Amm (wt %) | Amm (g) | DIW (wt %) | DIW (g) |
|---|---|---|---|---|---|---|---|---|
| Distillate I (172.1 g) | 32.71 | 55.8 | 8.33 | 14.2 | 0.10[1] | 1.79[1] | 58.85 | 100.3 |
| Distillate II (86.9 g) | 0.08 | 0.1 | 2.93 | 2.5 | 0.05[2] | 0.4[2] | 98.44 | 83.0 |

[1]is Amm I and [2]is Amm III.

The crystalline latex particle size may be controlled by adjusting the formulation (solvent to water ratio and neutralization ratio of polyester resin) and process parameters (batch temperature, mixing conditions, distillate II feeding temperature and rate).

Any suitable crystalline polyester resin containing acid groups may be used. Any suitable NA (a base reagent, basic reagent, base or base agent) may be used in the process as disclosed herein. In embodiments, the base may be ammonium hydroxide (Amm or AH). Other base reagents, such as, KOH, NaOH, NaHCO$_3$, Na$_2$CO$_3$ and the like may be used as well.

Unless otherwise indicated, all numbers expressing quantities and conditions, and so forth used in the specification and claims are to be understood as being modified in all instances by the term, "about." "About," is meant to indicate a variation of no more than 10% from the stated value. Also used herein is the term, "equivalent," "similar," "essentially," "substantially," "approximating," and, "matching," or grammatic variations thereof, have generally acceptable definitions or at the least, are understood to have the same meaning as, "about."

As used herein, "concentration," relates to any form of measure of items that are comparable directly. Thus, concentration can be by weight, volume, grams/mole, mole and so on. "Parts," relate to any relative measure that allows for direct comparison, such as, weight, volume, grams/mole, mole and so on.

Currently, ULM polyester toners result in a benchmark minimum fix temperature (MFT) which is reduced by about 20° C. as compared to that of conventional toners made by extrusion (for example, about 140° C. or more). In embodiments, an ULM toner of the present disclosure may have an MFT of from about 100° C. to about 130° C., from about 105° C. to about 125° C., from about 110° C. to about 120° C.

Resins

Any resin may be utilized in forming a latex emulsion of the present disclosure. The resins may be an amorphous resin or a crystalline resin. The resin may be a polyester resin, including the resins described, for example, in U.S. Pat. Nos. 6,593,049 and 6,756,176, the entire disclosure of each of which hereby is incorporated by reference in entirety. Suitable resins may include a mixture of high molecular and low molecular weight amorphous polyester resins.

The resin may be a polyester resin formed by reacting a polyol with a polyacid in the presence of an optional catalyst.

The polyol may be, for example, selected in an amount of from about 40 to about 60 mole %, from about 42 to about 55 mole %, from about 45 to about 53 mole %. The polyacid may be selected in an amount of, for example, from about 40 to about 60 mole %, from about 42 to about 52 mole %, from about 45 to about 50 mole %.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide) and poly(butylene-succinimide).

The crystalline resin may be present, for example, in an amount of from about 1 to about 50% by weight of the toner components, from about 5 to about 35% by weight of the toner components. The crystalline resin may possess various melting points of, for example, from about 30° C. to about 120° C., from about 50° C. to about 90° C. The crystalline resin may have a number average molecular weight (Mn), as measured by gel permeation chromatography (GPC) of, for example, from about 1,000 to about 50,000, from about 2,000 to about 25,000, and a weight average molecular weight (Mw) of, for example, from about 2,000 to about 100,000, from about 3,000 to about 80,000, as determined by GPC. The molecular weight distribution (Mw/Mn) of the crystalline resin may be, for example, from about 2 to about 6, from about 3 to about 5.

Polycondensation catalysts may be utilized in forming either the crystalline or amorphous polyesters and include tetraalkyl titanates, dialkyltin oxides, such as, dibutyltin oxide, tetraalkyltins, such as, dibutyltin dilaurate, and dialkyltin oxide hydroxides, such as, butyltin oxide hydroxide, aluminum alkoxides, alkyl zinc, dialkyl zinc, zinc oxide, stannous oxide or combinations thereof. Such catalysts may be utilized in amounts of, for example, from about 0.01 mole % to about 5 mole % based on the starting polyacid or polyester used to generate the polyester resin.

Other suitable resins that can be used to make toner comprise a styrene, an acrylate, such as, an alkyl acrylate, such as, methyl acrylate, ethyl acrylate, butyl acrylate, isobutyl acrylate, dodecyl acrylate, n-octyl acrylate, n-butylacrylate, 2-chloroethyl acrylate; β-carboxy ethyl acrylate (β-CEA), phenyl acrylate, methacrylate, butadienes, isoprenes, acrylic acids, acrylonitriles, styrene acrylates, styrene butadienes, styrene methacrylates, and so on, such as, methyl α-chloroacrylate, methyl methacrylate, ethyl methacrylate, butyl methacrylate, butadiene, isoprene, methacrylonitrile, acrylonitrile, vinyl ethers, such as, vinyl methyl ether, vinyl isobutyl ether, vinyl ethyl ether and the like; vinyl esters, such as, vinyl acetate, vinyl propionate, vinyl benzoate and vinyl butyrate; vinyl ketones, such as, vinyl methyl ketone, vinyl hexyl ketone, methyl isopropenyl ketone and the like; vinylidene halides, such as, vinylidene chloride, vinylidene chlorofluoride and the like; N-vinyl indole, N-vinyl pyrrolidone, methacrylate, acrylic acid, methacrylic acid, acrylamide, methacrylamide, vinylpyridine, vinylpyrrolidone, vinyl-N-methylpyridinium chloride, vinyl naphthalene, p-chlorostyrene, vinyl chloride, vinyl bromide, vinyl fluoride, ethylene, propylene, butylene, isobutylene and mixtures thereof. A mixture of monomers can be used to make a copolymer, such as, a block copolymer, an alternating copolymer, a graft copolymer and so on.

An amorphous resin or combination of amorphous resins utilized in the latex may have a glass transition temperature (Tg) of from about 30° C. to about 80° C., from about 35° C. to about 70° C. In embodiments, the combined resins utilized in the latex may have a melt viscosity of from about 10 to about 1,000,000 Pa*S at about 130° C., from about 50 to about 100,000 Pa*S at about 130° C.

In embodiments, where two or more resins are used, the resins may be in any suitable ratio (e.g., weight ratio), such as, of from about 1% (first resin)/99% (second resin) to about 99% (first resin)/1% (second resin), from about 10% (first resin)/90% (second resin) to about 90% (first resin)/10% (second resin).

In embodiments, a suitable toner of the present disclosure may include two amorphous polyester resins and a crystalline polyester resin. The weight ratio of the three resins may be from about 30% first amorphous resin/65% second amorphous resin/5% crystalline resin, to about 60% first amorphous resin/20% second amorphous resin/20% crystalline resin.

In embodiments, a suitable toner of the present disclosure may include at least two amorphous polyester resins, a high molecular weight (HWM) resin and a low molecular weight (LMW) resin. As used herein, an HMW amorphous resin may have an Mw of from about 35,000 to about 150,000, from about 45,000 to about 140,000, and an LMW amorphous resin may have an Mw of from about 10,000 to about 30,000, from about 15,000 to about 25,000.

The weight ratio of the two resins may be from about 10% first amorphous resin/90% second amorphous resin, to about 90% first amorphous resin/10% second amorphous resin.

In embodiments, the resin may possess acid groups which, in embodiments, may be present at a terminus of the resin. Acid groups, which may be present, include carboxylic acid groups, and the like. The number of acid groups may be controlled by adjusting the materials utilized to form the resin and reaction conditions.

In embodiments, the resin may be a polyester resin, including a crystalline resin, having an acid number from about 2 mg KOH/g of resin to about 200 mg KOH/g of resin, from about 5 mg KOH/g of resin to about 50 mg KOH/g of resin, from about 10 mg KOH/g of resin to about 15 mg KOH/g of resin. The acid number may be determined by titration with KOH/methanol solution containing phenolphthalein as the indicator.

The resin particles of interest can be greater than about 180 nm in size or width, that is, are greater than about 190 nm, are greater than about 200 nm in size or width.

Solvent

Any suitable organic solvent may be used to dissolve the resin, for example, alcohols, esters, ethers, ketones, amines and combinations thereof, in an amount of, for example, from about 30% by weight to about 400% by weight of the resin, from about 40% by weight to about 250% by weight of the resin, from about 50% by weight to about 100% by weight of the resin.

In embodiments, suitable organic solvents, sometimes referred to herein, in embodiments, as phase inversion agents, include, for example, methanol, ethanol, propanol, IPA, butanol, ethyl acetate, MEK and combinations thereof. In embodiments, the organic solvent may be immiscible in water and may have a boiling point of from about 30° C. to about 120° C. In embodiments when at least two solvents are used, the ratio of solvents can be from about 1:2 to about 1:15, from about 1:2.5 to about 1:12.5, from about 1:3 to about 1:10, from about 1:3.5 to about 1:7.5. Thus, if the first solvent is IPA and the second solvent is MEK, the ratio of IPA to MEK can be, for example, about 1:4, such as, 1 part of volume/weight of the first reagent to 4 parts of similar volume/weight of the second reagent.

Neutralizing Agent

In embodiments, the resin optionally may be mixed with a weak base or a neutralizing agent (NA). In embodiments, the neutralizing agent may be used to neutralize acid groups in the resins, so a neutralizing agent herein may also be referred to as a, "basic neutralization agent," "basic agent," and other such grammatic forms. Any suitable NA may be used in accordance with the present disclosure. In embodiments, suitable NA's may include both inorganic basic agents and organic basic agents. Suitable NA's may include ammonium hydroxide (AH or Amm), potassium hydroxide, sodium hydroxide, sodium carbonate, sodium bicarbonate, lithium hydroxide, potassium carbonate, combinations thereof and the like. Suitable basic agents may also include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines and so on and combinations thereof. In embodiments, the monocyclic and polycyclic compounds may be unsubstituted or substituted at any carbon position on the ring.

The basic agent may be utilized in an amount of from about 0.001% by weight to 50% by weight of the resin, from about 0.01% by weight to about 25% by weight of the resin, from about 0.1% by weight to 5% by weight of the resin. In embodiments, the neutralizing agent may be added in the form of an aqueous solution. In embodiments, the neutralizing agent may be added in the form of a solid. In embodiments, plural forms of bases are used in a process of interest. Hence, a process can comprise a first base, and at a different or successive step, a second base is used. The first and second bases can be the same or different.

Utilizing the above basic neutralization agent in combination with a resin possessing acid groups, a neutralization ratio of from about 25% to about 300% may be achieved, from about 50% to about 200%. In embodiments, the neutralization ratio may be calculated as the molar ratio of basic groups provided with the basic neutralizing agent to the acid groups present in the resin multiplied by 100%.

Addition of the basic neutralization agent may thus raise the pH of an emulsion including a resin possessing acid groups from about 5 to about 12, from about 6 to about 11. The neutralization of the acid groups may, in embodiments, enhance formation of the emulsion.

Surfactants

In embodiments, the process of the present disclosure optionally may include adding a surfactant, for example, before or during combining reagents, to the resin at an elevated temperature, in an emulsion, in a dispersion and so on. The surfactant may be added prior to mixing the resin at an elevated temperature.

Where utilized, a resin emulsion may include one, two or more surfactants. The surfactants may be selected from ionic surfactants and nonionic surfactants. Anionic surfactants and cationic surfactants are encompassed by the term, "ionic surfactants." In embodiments, the surfactant may be added as a solid or as a solution with a concentration of from about 5% to about 100% (pure surfactant) by weight, in embodiments, from about 10% to about 95% by weight. In embodiments, the surfactant may be utilized so that it is present in an amount of from about 0.01% to about 10% by weight of the resin, from about 0.05% to about 5% by weight, from about 0.1% to about 4% by weight of the resin.

Processing

The present process comprises forming a mixture by any known means, optionally, at an elevated temperature above room temperature, containing at least one resin, at least one organic solvent, optionally a surfactant, and a neutralizing agent to form a latex emulsion. The resins may be pre-blended prior to combining or mixing.

In embodiments, the elevated temperature may be a temperature near to or above the $T_g$ of the resin(s).

Thus, in embodiments, a process of the present disclosure may include contacting at least one resin with an organic solvent to form a resin mixture, heating the resin mixture to an elevated temperature, stirring the mixture, optionally adding a neutralizing agent to a crystalline resin or to neutralize the acid groups of the resin, adding water in two portions into the mixture until phase inversion occurs to form a phase inversed latex emulsion, distilling the latex to remove a water solvent mixture in the distillate and producing a latex, such as, with a low polydispersity, a lower percentage of fines, a lower percentage of coarse particles and so on.

In the phase inversion process, resin, such as, an amorphous and/or a combination of amorphous polyester resins or a crystalline resin, may be dissolved in a low boiling point organic solvent, which solvent is miscible or partially miscible in water, such as, MEK and any other solvent noted hereinabove, at a concentration of from about 1% by weight to about 75% by weight resin in solvent, from about 5% by weight to about 60% by weight resin in solvent, along with an NA. The resin mixture then is heated to a temperature of from about 25° C. to about 90° C., from about 30° C. to about 85° C. The temperature of the mixture up through and following addition of the second portion of water can be no lower than 65° C., no lower than 60° C., no lower than 55° C., no lower than 50° C. The heating need not be held at a constant temperature, but may be varied. For example, the heating may be increased slowly or incrementally until a desired temperature is achieved.

In embodiments, the resin may be dissolved in a combination of more than one organic solvent, for example, MEK and IPA.

The organic solvent and water are removed practicing methods known in the art, such as, distillation, such as, under reduced pressure or vacuum. The liquids of the resin emulsion then are reused in a subsequent PIE, the organic solvent solution (distillate I) is used to dissolve resin and the water solution (if removed by distillation, distillate II) is used to obtain phase inversion in a subsequent PIE. Thus, in the subsequent PIE, resin is dissolved in a solvent mixture wherein some or all of that solvent mixture comprises the organic solvent distillate from a prior PIE reaction, and the water used to obtain phase inversion is the water-rich fraction obtained following phase inversion from a prior PIE reaction. The process can be repeated any number of times where distillates of a PIE are used in a successive or second PIE.

In embodiments, the ratio of parts of resin to two or more solvents (for example, MEK and IPA) may be from about 10:5 to about 10:13, from about 10:5.5 to about 10:12, from about 10:6 to about 10:11. When two solvents are used, and an LMW resin is included, the ratio of the LMW resin to the first and to the second solvents can be from about 10:6:1.5 to about 10:10:2.5. When an HMW resin is included with two solvents, the ratio of the HMW resin to the first and to the second solvents can be from about 10:8:2 to about 10:11:3, although amounts outside of those ranges noted above can be used.

In embodiments, a surfactant may be added to the one or more ingredients of the resin composition before, during or after mixing. In embodiments, the surfactant may be added before, during or after addition of the neutralizing agent.

The mixing temperature may be from about 35° C. to about 100° C., from about 40° C. to about 90° C., from about 50° C. to about 70° C.

Once the resins, optional neutralizing agent and optional surfactant are combined, the mixture then may be contacted with a first portion of a water, to form a W/O emulsion. Water may be added to form a latex with a solids content of from about 5% to about 60%, from about 10% to about 50%. While higher water temperatures may accelerate dissolution, latexes may be formed at temperatures as low as room temperature (RT). In embodiments, water temperatures may be from about 40° C. to about 110° C., from about 50° C. to about 90° C.

The amount of water comprising the first portion of water is an amount suitable to form a W/O emulsion. Phase inversion can occur at about a 1:1 w/w or v/v ratio of organic phase to aqueous phase. Hence, the first portion of water generally comprises less than about 50% of the total volume or weight of the final emulsion. The first portion of water can be less than about 75% of the volume or weight of the organic phase, less than about 50%, less than about 40%, less than about 30% of the volume or weight of the organic phase. Lower amounts of water can be used in the fast portion so long as a suitable W/O emulsion is formed.

Phase inversion occurs on adding an optional aqueous alkaline solution or basic agent, optional surfactant and the second portion of water to create a phase inversed emulsion, including a dispersed phase including droplets possessing the molten ingredients of the resin composition and a continuous phase including the surfactant and/or water composition, where the second portion of water to attain PIP can be determined as taught herein.

Combining may be conducted, in embodiments, utilizing any means within the purview of those skilled in the art. For example, combining may be conducted in a glass kettle with an anchor blade impeller, an extruder, i.e., a twin screw extruder, a kneader, such as, a Haake mixer, a batch reactor or any other device capable of intimately mixing viscous materials to create near or homogenous mixtures.

Stirring, although not necessary, may be utilized to enhance formation of the latex. Any suitable stirring device may be utilized. In embodiments, the stirring may be at a speed of from about 10 revolutions per minute (rpm) to about 5,000 rpm, from about 20 rpm to about 2,000 rpm, from about 50 rpm to about 1,000 rpm. The stirring need not be at a constant speed and may be varied. For example, as the heating of the mixture becomes more uniform, the stirring rate may be increased or decreased. In embodiments, a homogenizer (that is, a high shear device), may be utilized to form the phase inversed emulsion, in embodiments, the process of the present disclosure may take place without the use of a homogenizer. Where utilized, a homogenizer may operate at a rate of from about 3,000 rpm to about 10,000 rpm.

Although the point of phase inversion may vary depending on the components of the emulsion, the temperature of heating, the stirring speed and the like, phase inversion may occur when the optional basic neutralization agent, optional surfactant and water are added so that the resulting resin is present in an amount from about 5% by weight to about 70% by weight of the emulsion, from about 20% by weight to about 65% by weight, from about 30% by weight to about 60% by weight of the emulsion.

Following phase inversion, additional optional surfactant, water and optional aqueous alkaline solution may be added to dilute the phase inversed emulsion, although not required.

Following phase inversion, the inversed emulsion may be cooled to room temperature, for example from about 20° C. to about 25° C.

In embodiments, distillation, optionally, under reduced pressure, optionally, with stirring, can be used to remove organic solvent(s), and optionally the water-rich fluid, to provide resin particles with an average diameter size of greater than about 170 nm, greater than about 180 nm, greater than about 190 nm.

The desired properties of the resin emulsion (i.e., particle size and low residual solvent level) may be achieved by adjusting the solvent and neutralizer concentration and process parameters (i.e., reactor temperature, vacuum and process time).

The coarse content of the latex of the present disclosure, that is, particles that are larger than the most prevalent or desired population of particles, may be from about 0.01% by weight to about 5% by weight, from about 0.1% by weight to about 3% by weight of the population of particles. The coarse particle content as well as the fine particle content can be determined by obtaining pertinent information from a cumulative particle distribution. The solids content of the latex of the present disclosure may be from about 10% by weight to about 60%, from about 20% by weight to about 50% by weight.

The crystalline resin is produced as described herein using SR PIE. As the crystalline resin can be acidic, a neutralizing agent can be used to neutralize the resin during dissolution and to control CPE resin particle size. Also, as described herein, the distillate, both the solvent-rich portion and the water-rich portion are reserved and can be used in a subsequent PIE reaction for producing a crystalline latex.

Toner

The resulting latex, including a CPE prepared as taught herein, then may be utilized to form a toner by any method within the purview of those skilled in the art. The latex emulsion may be contacted with an optional colorant, optionally in a dispersion, and other additives to form a toner by a suitable process, in embodiments, an emulsion aggregation and coalescence process.

In embodiments, the optional additional ingredients of a toner composition including optional colorant, wax and other additives, may be added before, during or after melt mixing the resin to form the latex emulsion of the present disclosure.

Colorants

One or more colorants may be added, and various known suitable colorants, such as dyes, pigments, mixtures of dyes, mixtures of pigments, mixtures of dyes and pigments, and the like, may be included in the toner. In embodiments, the colorant, when present, may be included in the toner in an amount of, for example, 0 to about 35% by weight of the toner, from about 1 to about 25% by weight of the toner, from about 3 to about 5% by weight of the toner, although the amount of colorant can be outside of those ranges.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™or TMB-104™; and the like. As colored pigments, there can be selected cyan, magenta, yellow, red, green, brown, blue or mixtures thereof. Generally, cyan, magenta or yellow pigments or dyes or mixtures thereof, are used. The pigment or pigments are generally used as water-based pigment dispersions.

In embodiments, the colorant may include a pigment, a dye, combinations thereof, carbon black, magnetite, black, cyan, magenta, yellow, red, green, blue, brown, combinations thereof, in an amount sufficient to impart the desired color to the toner.

Wax

Optionally, a wax may also be combined with the resin and an optional colorant in forming toner particles. The wax may be provided in a wax dispersion, which may include a single type of wax or a mixture of two or more different waxes.

When included, the wax may be present in an amount of, for example, from about 1% by weight to about 25% by weight of the toner particles, from about 5% by weight to about 20% by weight of the toner particles, although the amount of wax can be outside of those ranges. Waxes that may be selected include waxes having, for example, an average molecular weight of from about 500 to about 20,000, from about 1,000 to about 10,000.

Waxes that may be used include, for example, polyolefins, such as, polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, naturally occurring waxes such as those obtained from plant sources or animal sources, and polybutene waxes. Mixtures and combinations of the foregoing waxes may also be used, in embodiments. In embodiments, the waxes may be crystalline or non-crystalline.

In embodiments, the wax may be incorporated into the toner in the form of one or more aqueous emulsions or dispersions of solid wax in water, where the solid wax particle size may be in the range of from about 100 to about 500 nm.

Toner Preparation

The toner particles may be prepared by any method within the purview of one skilled in the art. Although embodiments relating to toner particle production are described below with respect to emulsion aggregation processes, any suitable method of preparing toner particles may be used, including, chemical processes, such as, suspension and encapsulation processes disclosed in U.S. Pat. Nos. 5,290,654 and 5,302,486, the entire disclosure of each of which hereby is incorporated by reference in entirety.

In embodiments, toner compositions may be prepared by emulsion aggregation processes, such as, a process that includes aggregating a mixture of an optional colorant, an optional wax and any other desired or required additives, an amorphous resin and an emulsion including the crystalline resin described above, optionally in surfactants as described above, and then coalescing the aggregated mixture. A mixture may be prepared by adding a colorant and optionally a wax or other materials, which may also be optionally in a dispersion (s) including a surfactant, to the resin emulsion. The pH of the resulting mixture may be adjusted by an acid, such as, for example, acetic acid, nitric acid or the like to from about 2 to about 5. Additionally, in embodiments, the mixture may be homogenized. If the mixture is homogenized, that may be by mixing at about 600 to about 6,000 rpm. Homogenization may be accomplished by any suitable means, including, for example, an IKA ULTRA TURRAX T50 probe homogenizer.

Following preparation of the above mixture, an aggregating agent may be added to the mixture. Any suitable aggregating agent may be utilized to form toner. Suitable aggregating agents include, for example, aqueous solutions of a divalent cation or a multivalent cation material. The aggregating agent may be, for example, an inorganic cationic aggregating agent, such as, polyaluminum halides, such as, polyaluminum chloride (PAC), or the corresponding bromide, fluoride or iodide, polyaluminum silicates, such as, polyaluminum sulfosilicate (PASS), and water soluble metal salts, including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate and combinations thereof. In embodiments, the aggregating agent may be added to the mixture at a temperature that is below the Tg of the resin.

The aggregating agent may be added to the mixture utilized to form a toner in an amount of, for example, from about 0.1% to about 10% by weight of the resin in the mixture.

The particles may be permitted to aggregate until a predetermined desired particle size is obtained. Particle size can be monitored during the growth process, for example with a COULTER COUNTER, for average particle size. The aggregation may proceed by maintaining the elevated temperature, or slowly raising the temperature to, for example, from about 40° C. to about 100° C., and holding the mixture at that temperature for a time of from about 0.5 hours to about 6 hours, from about 1 hour to about 5 hours, while maintaining stirring, to provide the aggregated particles. Once the desired size is reached, an optional shell resin can be added.

Once the desired final size of the toner particles is achieved, the pH of the mixture may be adjusted with base to a value of from about 3 to about 10, from about 5 to about 9. The adjustment of the pH freezes, that is, stops, toner particle growth. The base utilized to stop toner growth may include any suitable base such as, for example, alkali metal hydroxides, such as, for example, sodium hydroxide, potassium hydroxide, ammonium hydroxide, combinations thereof and the like. In embodiments, a chelator, such as, ethylene diamine tetraacetic acid (EDTA), may be added to help adjust the pH to the desired values noted above.

Shell Resin

In embodiments, after aggregation, but prior to coalescence, a resin coating may be applied to the aggregated particles to form a shell thereover. In embodiments, the core may thus include an amorphous resin and/or a crystalline resin, as described above. Any resin described above or known in the art may be utilized as the shell.

The shell resin may be applied to the aggregated particles by any method within the purview of those skilled in the art. In embodiments, the resins utilized to form the shell may be in an emulsion, including any surfactant described above. The emulsion may contain an initiator, a branching agent and so on, as known in the art.

The formation of the shell over the aggregated particles may occur while heating to a temperature of from about 30° C. to about 80° C. Formation of the shell may take place for a period of time of from about 5 min to about 10 hr.

The shell may be present in an amount of from about 10% by weight to about 40% by weight of the latex particles, from about 20% by weight to about 35% by weight of the latex particles.

In embodiments, the final size of the toner particles may be less than about 8 µm, less than about 7 µm, less than about 6 µm in size.

Coalescence

Following aggregation to the desired particle size and application of any optional shell, the particles then may be coalesced to the desired final shape, the coalescence being achieved by, for example, heating the mixture to a temperature of from about 45° C. to about 100° C., from about 55° C. to about 99° C., which may be at or above the Tg of the resin(s) utilized to form the toner particles. Coalescence may be accomplished over a period of from about 0.01 to about 9 hours, from about 0.1 to about 4 hours.

After aggregation and/or coalescence, the mixture may be cooled to room temperature (RT), such as, from about 20° C. to about 25° C. The cooling may be rapid or slow, as desired. A suitable cooling method may include introducing cold water to a jacket around the reactor. After cooling, the toner particles optionally may be washed with water and then dried. Drying may be accomplished by any suitable method for drying, including, for example, freeze-drying.

Additives

In embodiments, the toner particles may contain optional additives, as desired or required. For example, the toner may include positive or negative charge control agents, for example, in an amount of from about 0.1 to about 10% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the entire disclosure of which hereby is incorporated by reference in entirety; organic sulfate and sulfonate compositions, including those disclosed in U.S. Pat. No. 4,338,390, the entire disclosure of which hereby is incorporated by reference in entirety; cetyl pyridinium tetrafluoroborates; distearyl dimethyl ammonium methyl sulfate; aluminum salts, such as, BONTRON E84™ or E88™ (Orient Chemical Industries, Ltd.); combinations thereof and the like.

There also can be blended with the toner particles external additive particles after formation including flow aid additives. Examples of the additives include metal oxides, such as, titanium oxide, silicon oxide, aluminum oxides, cerium oxides, tin oxide, mixtures thereof and the like; colloidal and amorphous silicas, such as AEROSIL®, metal salts and metal salts of fatty acids inclusive of zinc stearate and calcium stearate, or long chain alcohols, such as, UNILIN 700, and mixtures thereof.

Each of the external additives may be present in an amount of from about 0.1% by weight to about 5% by weight of the toner, although the amount of additives can be outside of those ranges.

In embodiments, toners of the present disclosure may be utilized as ultra low melt (ULM) toners.

In embodiments, the dry toner particles having a shell of the present disclosure may, exclusive of external surface additives, have the following characteristics: (1) volume average diameter (also referred to as "volume average particle diameter") of from about 3 to about 25 µm, from about 4 to about 15 µm, from about 5 to about 12 µm; (2) number average geometric size distribution ($GSD_n$) and/or volume average geometric size distribution ($GSD_v$) of from about 1.05 to about 1.55, from about 1.1 to about 1.4; and (3) circularity of from about 0.93 to about 1, in embodiments, from about 0.95 to about 0.99 (as measured with, for example, a Sysmex FPIA 2100 analyzer).

The characteristics of toner particles may be determined by any suitable technique and apparatus, such as, a Beckman Coulter MULTISIZER 3. A cumulative particle size distribution can be used to obtain population parameters, such as, $D_{16}$, $D_{50}$ and $D_{84}$ values, for number or volume, which can be used to estimate the relative amount of coarse particles, median particle size and the relative amount of fine particles.

A thus produced toner can be used in known electrophotographic materials and methods to obtain copies of an original on a suitable substrate, such as, a paper.

The subject matter now will be exemplified in the following non-limiting examples. Parts and percentages are by weight unless otherwise indicated.

EXAMPLES

Example 1

Control Resin with Pure DI Water for Distillate II

The formulation in Table 1 was used to prepare CPE latex. Distillate from a prior PIE was used, 170.5 g of distillate I was compensated according to the formulation (added 64.2 g MEK, 5.8 g IPA, 2.21 g AH I and 1.3 g DI water) and used to dissolve 200 g crystalline polyester resin in a 2 L flask under 250 rpm for dissolution. The batch temperature was set at 65° C. After holding at 65° C. for 30 min to dissolve the resin, another 5.4 g fresh 10% NH$_4$OH solution (Amm II) were charged into the resin dispersion within 2 min. The neutralization ratio was calculated using 10% NH$_3$, and the amount of 10% NH$_3$ in parts (Amm I and II) was calculated based on the following equation:

10% NH$_3$=neutralization ratio*amount of resin in parts*AV*0.303*0.01

A neutralization ratio of 149% was used. The mixture was left to stir for 10 min. Then, 15 parts or 300 g DIW II at 65° C. were pumped into the flask within 60 min. The emulsion produced after DI water (II) was added had a particle size, $D_{50}$, of 120 nm, as measured by a Nanotrac particle size analyzer. $D_{50}$ was recorded to compare the particle size, and $D_{95}$ and width were used to evaluate the particle size distribution. The data of particle size for the control are provided in Table 3.

TABLE 3

Particle size data for CPE latex made with or without solvent reuse

| Sample ID | $D_{50}$ (nm) | $D_{95}$ (nm) | Width (nm) |
|---|---|---|---|
| Control | 120 | 184 | 60 |
| Experimental | 122 | 188 | 65 |

Example 2

Experimental Resin with Prior Distillate II for Distillate II

The same materials and methods as used in Example 1 were practiced. About 170.5 g distillate I from a prior PIE were weighed and compensated with fresh reagents to dissolve and to obtain the same resin mix in a 2 L flask. The amounts of MEK, IPA and Amm in distillate II from a prior PIE were determined. After charge of 5.4 g Amm II into the mix in the 2 L flask, 213.5 g of DI water II were fed into the batch followed by the 86.9 g of distillate II from the prior PIE to phase inverse the resin dispersion at 65° C. under 350 rpm. The neutralization ratio was calculated based on 0.47 parts of Amm I and II, which was the same as that of Example 1, 149%.

Based on calculations using the formulae for calculating PIP above, only an additional 102 g DI water II along with distillate II were needed to achieve phase inversion. Therefore, the 213.5 g DI water used in the batch was in excess to attain phase inversion.

The emulsion had a particle size, $D_{50}$, of 122 nm as measured by a Nanotrac particle size analyzer. The data of particle size are presented in Table 3 (supra).

From Table 3, it may be observed that as compared with the control resin which was completed with pure DI water and no distillate II, the experimental resin completed with distillate II, had equivalent and consistent particle size. Thus, resin neutralization ratio is based primarily on NA I (from distillate I) and NA II (fresh charged ammonia). NA III from distillate II has minimal impact on final particle size.

It will be appreciated that various of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are incorporated herein by reference in entirety.

We claim:

1. A phase inversion emulsification (PIE) method for producing crystalline polyester (CPE) particles comprising:
   a) dissolving a CPE resin comprising one or more acid groups in a solvent, a first portion of a base, and optionally a first portion of water to form a neutralized latex dispersion;
   b) adding a second portion of water and optionally a second portion of said base to said neutralized latex dispersion of step a) to form a latex emulsion;
   c) distilling from said latex emulsion of step b) a distillate containing two fractions comprising:
      a distillate fraction I comprising said solvent, said base and water, and
      a distillate fraction II comprising said solvent, said base and water, wherein concentration of said solvent in distillate fraction II is less than concentration of said solvent in distillate fraction I,
   wherein said distilling separates CPE particles;
   d) collecting distillate fraction I of step c) to form reuse distillate fraction I, and collecting distillate fraction II of step c) to form reuse distillate fraction II;
   e) dissolving a CPE resin comprising one or more acidic groups in said reuse distillate fraction I and optionally adding said solvent, optionally adding a first portion of said base and optionally adding a first portion of water to form a neutralized latex dispersion;
   f) adding a second portion of water, said reuse distillate fraction II and optionally a second portion of said base to said neutralized latex dispersion of step e) to form a latex emulsion;
   g) distilling from said latex emulsion of step f) a distillate containing two fractions comprising:
      a distillate fraction I comprising said solvent, said base and water, and
      a distillate fraction II comprising said solvent, said base and water, wherein concentration of said solvent in distillate fraction II is less than concentration of said solvent in distillate fraction I,
   wherein said distilling separates CPE particles; and
   h) combining said distillate fraction I of step g) with said reuse distillate fraction I, and combining said distillate fraction II of step g) with said reuse distillate fraction II.

2. The PIE method of claim 1, wherein said CPE resin of step a) is used as said CPE resin of step e).

3. The PIE method of claim 1, wherein said base comprises ammonium hydroxide.

4. The PIE method of claim 1, wherein the first portion of water of step a), said first portion of water of step e) or both is determined by:
(i) calculating the Viscosity Blending Number or Index (VBN) for each component of the neutralized latex dispersion using equation 1 (eq. 1):

$$VBN = 14.534 \times \ln[\ln(v+0.8)] + 10.975 \quad (eq. 1),$$

wherein v is kinematic viscosity in centistokes (cSt);
(ii) calculating VBN of the dispersion using equation 2 (eq. 2):

$$VBN_{mixture} = [X_A \times VBN_A] + [X_B \times VBN_B] + \ldots [X_N \times VBN_N] \quad (eq. 2)$$

wherein X is mass fraction of each component of the dispersion,
(iii) calculating kinematic viscosity of the dispersion by solving eq. 1 for v resulting in equation 3 (eq. 3), and $$v = \exp\left(\exp\left(\frac{VBN_{mixture} - 10.975}{14.534}\right)\right) - 0.8, \quad (eq. 3)$$

(iv) calculating the water fraction at the maximum $VBN_{mixture}$ for the dispersion using equation 4 (eq. 4):

$$\frac{\mu_\varphi}{\mu_c} = (1 - \varnothing)^{-2.5}, \quad (eq. 4)$$

wherein $\mu_\varphi$ is viscosity of the dispersed phase of the dispersion, $\mu_c$ is viscosity of a continuous phase of the dispersion, which is equal to $VBN_{mixture}$, and $\Phi$ is water fraction of the dispersion, and where $\Phi$ is a sum of the first portion of water, any water portion of the base and a second portion of water, where the water fraction is the amount of water added to the neutralized latex dispersion to attain a phase inversion point (PIP) for the neutralized dispersion.

5. The method of claim 1, wherein said CPE resin of step a), said CPE resin of step e) or both is selected from the group consisting of poly(ethylene-adipate), poly(propylene-adipate), poly(butylene-adipate), poly(pentylene-adipate) poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate), poly(ethylene-adipamide), poly(propylene-adipamide), poly(butylenes-adipamide), poly(pentylene-adipamide), poly(hexylene-adipamide), poly(octylene-adipamide), poly(ethylene-succinimide), poly(propylene-sebecamide), poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), poly(butylene-succinimide), and combinations thereof.

6. The PIE method of claim 1, wherein said CPE resin of step a) said second CPE resin of step e) or both comprises an acid number from about 2 mg KOH/g of resin to about 200 mg KOH/g of resin.

7. The PIE method of claim 1, wherein said solvent is selected from the group consisting of alcohols, esters, ethers, ketones, amines and combinations thereof.

8. The PIE method of claim 1, wherein said solvent is selected from the group consisting of methanol, ethanol, propanol, isopropanol (IPA), butanol, ethyl acetate, methyl ethyl ketone (MEK) and combinations thereof.

9. The PIE method of claim 1, wherein said solvent comprises at least two solvents in a ratio, in parts, from about 1:2 to about 1:15.

10. The PIE method of claim 1, wherein said base is selected from the group consisting of ammonium hydroxide, potassium hydroxide, sodium hydroxide, sodium carbonate, sodium bicarbonate, lithium hydroxide, potassium carbonate, aziridines, azetidines, piperazines, piperidines, pyridines, bipyridines, terpyridines, dihydropyridines, morpholines and combinations thereof.

11. The PIE method of claim 1, wherein said solvent comprises MEK and IPA.

12. The PIE method of claim 1, wherein said steps a), b), e) and f) comprise a temperature no lower than about 65° C.

13. The PIE method of claim 1, wherein said distilling of step c), step g) or both occurs under reduced pressure.

14. The PIE method of claim 1, wherein said CPE particles of step c), step g) or both are greater than about 180 nm.

15. The PIE method of claim 1, wherein neutralization ratio of said latex emulsion of step b), step f) or both is from about 25% to about 300%.

16. The PIE method of claim 1, wherein neutralization ratio of said latex dispersion of step a), step e) or both is from about 25% to about 300%.

17. The PIE method of claim 1, wherein said adding step b), step f) or both comprises mixing.

18. The PIE method of claim 1, further comprising:
i) dissolving a CPE comprising one or more acidic groups in said reuse distillate fraction I and optionally adding said solvent, optionally adding a first portion of said base and optionally adding a first portion of water to form a neutralized latex dispersion;
j) adding a second portion of water, said reuse distillate fraction II and optionally a second portion of said base to said neutralized latex dispersion of step i) to form a latex emulsion;
k) distilling from said latex emulsion of step j) a distillate containing two fractions comprising:
a distillate fraction I comprising said solvent, said base and water, and
a distillate fraction II comprising said solvent, said base and water, wherein concentration of said solvent in distillate fraction II is less than concentration of said solvent in distillate fraction I,
wherein said distilling separates CPE particles; and
l) combining said distillate fraction I of step k) with said reuse distillate fraction I, and combining said distillate fraction II of step k) with said reuse distillate fraction II.

19. The PIE method of claim 18, further comprising repeating steps i)-l).

20. The PIE method of claim 18, wherein said CPE resin of step a) is used as said CPE resin of step i).

\* \* \* \* \*